US00RE37334B1

(19) United States
(12) Reissued Patent
Jacquet et al.

(10) Patent Number: US RE37,334 E
(45) Date of Reissued Patent: Aug. 21, 2001

(54) DATA TRANSMISSION DEVICE FOR RANDOM ACCESS NETWORK, WITH IMPROVED COLLISION RESOLUTION, AND CORRESPONDING METHOD

(75) Inventors: Philippe Jacquet, Buc; Paul Muhlethaler, Maisons-Laffitte, both of (FR)

(73) Assignee: Inria Institut National de Recherche en Informatique et en Automatique, Le Chesney Cedex (FR)

(21) Appl. No.: 09/078,324

(22) PCT Filed: Mar. 30, 1993

(86) PCT No.: PCT/FR93/00318

§ 371 Date: Sep. 27, 1994

§ 102(e) Date: Sep. 27, 1994

(87) PCT Pub. No.: WO93/20638

PCT Pub. Date: Oct. 14, 1993

Related U.S. Patent Documents

Reissue of:
(64) Patent No.: 5,517,501
Issued: May 14, 1996
Appl. No.: 08/307,584
Filed: Sep. 27, 1994

(30) Foreign Application Priority Data

Apr. 2, 1992 (FR) ..... 92 04033

(51) Int. Cl.[7] ..... H04L 12/413
(52) U.S. Cl. ..... 370/447; 370/444
(58) Field of Search ..... 370/241, 447, 370/503, 442, 443, 444, 445, 446, 448, 449, 451, 455, 458, 459, 461, 462, 468, 389, 395, 399, 397; 340/825.5, 825.51, 825.52

(56) References Cited

U.S. PATENT DOCUMENTS 4,847,835 7/1989 Le Lann et al. ..... 370/85.3
5,268,899 * 12/1993 Brown ..... 370/85.3
5,353,287 * 10/1994 Kuddes et al. ..... 370/85.6
5,369,639 * 11/1994 Kamerman et al. ..... 370/85.3
5,394,391 * 2/1995 Chen et al. ..... 370/85.3

FOREIGN PATENT DOCUMENTS 2 597 686 10/1987 (FR) .

OTHER PUBLICATIONS

G. Ramachandran, "A General Purpose Hardware Approach To Ethernet", *Electro,* vol. 8:10.5.1–10.4.10, (1983).

Patent Abstract of Japan, vol. 10, No. 340 (E–455), Nov. 18, 1986, abstract of Akihiko Obayashi, "Data Transmission Controller", Japanese 61–142839, Dec. 17, 1984.

Gopalakrishnan et al., "Medium Access Control Schemes For Local Area Networks With Multiple Priority Function", *The Computer Journal,* vol. 31, No. 3, pp. 209–219, (1988).

* cited by examiner

*Primary Examiner*—Dang Ton
(74) *Attorney, Agent, or Firm*—Foley & Lardner

(57) ABSTRACT

A data processing station wherein a network interface monitors the transmission channel and generates event signals, e.g. "transmission start" "collision detected" and "channel back to vacant condition". If a collision occurs in local transmission, transmission is maintained with a collision indication for at least one period before being cut off. An observation register receives the event signals and responds by generating a channel observation signal which may be "transmission OK" "collision slot" and "vacant slot". When transmission of a fresh data packet is requested, a first transmission may or may not be attempted (normal mode) depending on the condition of the observation register. If the attempt is unsuccessful (transmission refused or collision), a suitably reset mechanism for incrementing/decrementing a common integer determines the right to transmit, so that the response to a request for the transmission of a fresh data packet is made regardless of the channel's operating record, upstream from the last normal mode to be executed.

16 Claims, 4 Drawing Sheets

DATA TRANSMISSION DEVICE FOR RANDOM ACCESS NETWORK, WITH IMPROVED COLLISION RESOLUTION, AND CORRESPONDING METHOD

Matter enclosed in heavy brackets [ ] appears in the original patent but forms no part of this reissue specification; matter printed in italics indicates the additions made by reissue.

The invention concerns computer networks which allow the exchange of information or "data" between different terminals.

Such a network conventionally comprises a transmission medium, generally an electrical or fiber optic cable. Stations or terminals are connected at various places on this cable, this connection being made through a "network interface".

It is essential for the terminals to understand each other, despite their multiplicity. In some computer networks, a rule (multiplexing, token) is determined for this purpose, in accordance with which no more than one of the terminals may transmit over the communication medium at a given moment. Another technique permits "random access" to the network, that is to say several terminals may transmit at the same time. One consequence of this multiple access is that "collisions" may occur, and it will then be necessary to resolve them.

The ETHERNET (registered trade mark) network, governed by the standard known as IEEE 802.3, is of the random access type. The network management protocol is of the multiple access carrier sensing type with collision detection, or CSMA/CD (Carrier Sense Multiple Access with Collision Detection).

One of the essential features of such a network is its ability to effect a "collision resolution" rapidly. This is because, when a transmission has given rise to a collision, it is necessary to recommence transmission. This has the direct effect of increasing the instantaneous need for transmission. As a result, if a multiple access channel is operating with very high traffic, the collision resolution may take correspondingly longer, and consequently the waiting time for a successful transmission correspondingly more protracted.

The Applicant has moreover observed that at least two types of data traffic can be distinguished:

a) data coming from sensors in real time, for example voice (telephony) or video (image);

b) exchanges of files or knowledge tables coming from bulk storage, which are pure data packets.

The Applicant has also observed that the constraints which are applied to the exchange of these different types of data are fairly divergent.

Data coming from sensors in real time arm generally fairly heavily redundant. As a result it is possible to accept a significant loss rate for these data packets without appreciable degradation of the quality of the data conveyed: it is known for example that voice telephony data, which are highly redundant, may be cut to a great extent without loss of intelligibility. On the other hand, telephony data packets must be carried within strict time periods.

In contradistinction to this, exchanges of file data for example are much less sensitive to transmission times. On the other hand, they are not able to sustain any level of data loss and are very demanding in terms of passband. In addition, they require acknowledgement of reception and flow monitoring protocols, which is not the case with voice data packets for example.

This poses different problems, which the invention is aimed at helping to resolve.

A first aim of the invention is to provide a better collision resolution technique, which increases the efficacy of a multiple access channel.

The second aim of the invention is to allow the use and implementation of priority classes in the operation of this collision resolution technique.

In order to form a computer network from a transmission medium or channel, a device is associated with each data processing terminal, comprising:

a network interface, capable of the transmission/reception of messages over the channel, with monitoring of the channel in order to establish event signals, which selectively represent the direction of the start of a transmission on the channel, the detection of any new collision, and the detection of the return of the channel to the vacant state, and a transmission/reception management device, for controlling the network interface in accordance with the event signals.

Means are provided, in general in the network interface, to ensure that, in the event of a collision, transmission is maintained (with indication of collision) for a sufficient length of time for all the stations concerned (within range of the stations which are the cause of the collision) to have detected this collision, after which all transmission is interrupted. As a result a "collision slot" is defined.

According to a first aspect of the invention, the device comprises a channel observation register which receives any event signal and in response establishes a channel observation signal, amongst a predetermined set of possibilities, this set comprising transmission (emission or reception), "collision slot", or "vacant slot", the collision time slot being made subject to a first minimum period (C), and the vacant slot existing only when the vacant channel state has lasted for a second minimum period (B) at least equal to the maximum outward and return propagation time for a signal on the channel and less than the first minimum period.

Consideration is now given to the time where the management device has a new packet to transmit, that is to say it receives a request to transmit a data packet. It then awaits a predetermined number (>=1) of refreshings of the state of the observation register ("refreshing" means change of state or reconfirmation of the same state). A first transmission attempt may or may not be enabled, depending on the observed sequence of change of state of the observation register. "Failure" means the cases where the attempt at transmission is not enabled or those where it results in a collision. In the event of failure, the management device reacts by initializing a current integer (E), to a value between a first (0) and a second (M−1) limit integer, inclusive. It then causes the current integer (E) to vary in accordance with a predetermined law, which is a function of the observation signal, or of sequences of values of this observation signal. It is preferably ensured that this sequence of observations does not go beyond the last attempt at transmission or the last failure indexed.

The predetermined law is preferably chosen as follows: it tends to move the current integer away from the first limit integer (0) if there is an abundance of collision slots; it tends to move it closer to it if there is an abundance of vacant slots. The word "abundance" here refers to the fact that it is possible to use any absolute or relative representation (average, for example) of the number of collision slots, or vacant slots, obtained over the interval of time in question.

When, the current integer (E) reaches the first limit integer (0), the device carries out a further observation of the channel in order to enable, or otherwise, a further attempt. In the event of failure, the device repeats the mechanism described above.

A person skilled in the art will understand that this collision resolution technique requires continuous observation of the channel only during two attempts to transmit any one packet. In other words, it does not require the maintenance at all times of a history, even partial, of the channel, upstream of the last attempt to transmit the packet concerned. This denotes the originality of the novel technique compared with the Ethernet collision resolution method (Binary Exponential Back-off) and the one described in French patent No 84 16 957, in the name of the Applicant, published under the No 2 597 686. This feature confers significant properties of robustness and efficacy on the technique proposed.

The initial value of the chosen integer (E) is preferably substantially random. It may be supplied by a pseudo-random generator operating on an integer of at least 10 bits, modulated by at least one integer of no more than 10 bits, specific to the terminal concerned, the result being referred to the interval of the limits of the said chosen integer (E).

According to a variant of the invention, the current integer is also taken closer to the first limit integer when there is a transmission without collision.

The invention may also be presented in the form of a collision resolution method in a data transmission network of the multiple access type, the said method being open to the same variants as the device described above.

According to another characteristic of the invention, priority data are provided, and also a comparison device based on data derived from pseudo-random quantities in order to favor the transmission of data of higher priority in the above-mentioned collision resolution technique.

Other characteristics and advantages of the invention will emerge from an examination of the following detailed description and accompanying drawings, in which.

The accompanying drawings are, essentially, of a definite nature. They consequently form an integral part of the description and can not only serve to supplement it but also contribute to the definition of the invention where appropriate.

In addition, the Applicant is on this date filing another patent application entitled "Data transmission installation of the radio network type, and corresponding method". Because of the technical relationships with the present Application, the description and the drawings of this other Application can also be incorporated into the present description.

Figure 1:
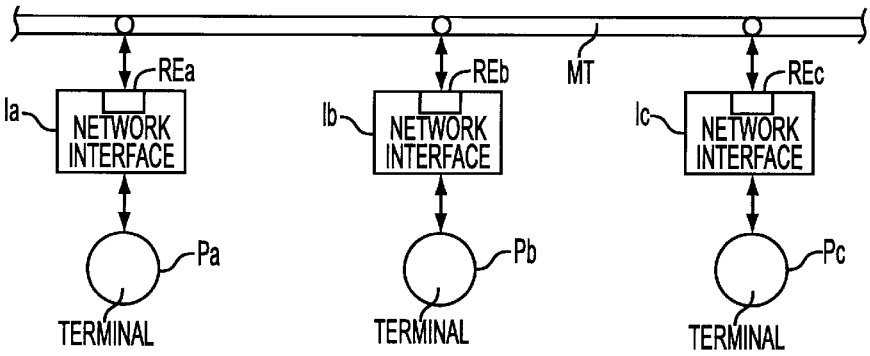
FIG. 1 is a highly simplified diagram of a computer network in which the transmission medium is a cable.

In FIG. 1, a transmission medium MT is connected to network interfaces Ia to Ic, respectively connected to terminals Pa to Pc. This is the conventional structure of a data transmission computer network, to which the CSMA/CD protocol already mentioned can be applied, in accordance with IEEE 802.3.

Experts are aware that the models defining such interfaces are specified "in layers" (ISO standard), to each of which a precise function is assigned. This partitioning into functional layers makes it possible to ensure the compatibility of components of the network from different sources, when they are interconnected. Reference will be made below to this concept of layer. Moreover, distinction will be made between the protocol layers proper and the upper layers of the protocol.

Terminals such as Pa are data processing terminals (the word processing is used here in the most elementary sense, since this processing may be very simple). All processing carried out in the terminal is outside the data transmission proper. However, in the terminal there may be specific operations taking specific account of the nature of and certain conditions applicable to data transmission. These are the upper layers of the protocol.

The layers of the protocol itself will on the other hand govern the transmission of data in its basic state, in a way which makes it possible to ensure its security.

Figure 2:
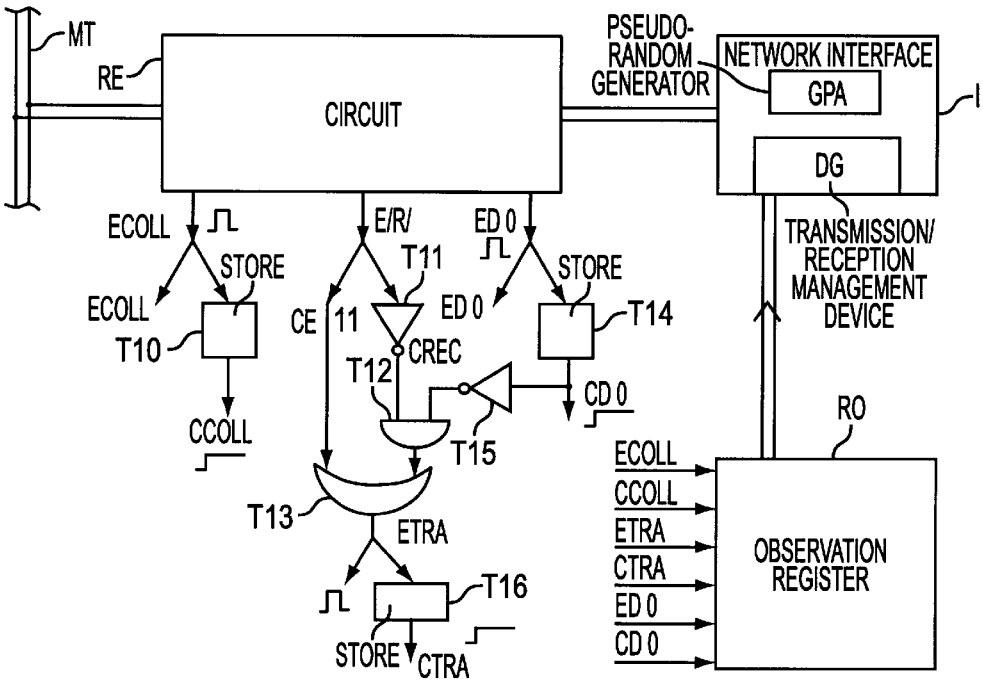
FIG. 2 is a partially detailed diagram of the network interface of a terminal.

Each network interface I has a circuit RE for immediate connection to the network. These components I and RE are separate in FIG. 2.

The unit RE supplies for example three detection signals, namely:

ECOLL: a collision has just taken place on the channel;

E/R, true if outward transmission is taking place, false during reception;

ED0, which means, during reception, that no data has been received.

The signal ED0 is stored at T14 in order to give CD0, which remains true as long as no data is received. The signal E/R is complemented by T11, in order to give REC, true during reception. REC is applied, together with CD0 complemented by T15, to an AND function at T12, the output of which therefore indicates the effective receipt of data. Finally, an OR function at T13 supplies the signal ETRA which represents change from the vacant channel state to a start of transmission (outward transmission or reception), and is stored at T16 in order to give the transmission state CTRA.

Any collision detection ECOLL is stored at T10 in order to give CCOLL, repetitively. It is known that any transmission subject to collision can be prolonged so that it lasts for a minimum time C, at least equal to the maximum outward and return propagation time for a signal over the channel MT, increased by the time required to detect a collision (in all, the minimum time necessary for a collision to be detected by all the terminals connected to the channel MT; it is referred to here as the "collision slot").

The signals ED0 and CD0 represent the return of the channel MT to the vacant state, either at the end of a successful transmission or at the end of a transmission subject to collision.

In other words, the detector RE, which can also be referred to as a "tracer", makes it possible to establish the following information, preferably in the form of pulses or time and state transitions:

changing from the vacant channel state to a start of transmission (outward transmission or reception), detection of a collision, during a transmission phase, end of transmission with success (return to the vacant state), end of transmission with collision (return to vacant state).

Figure 3:
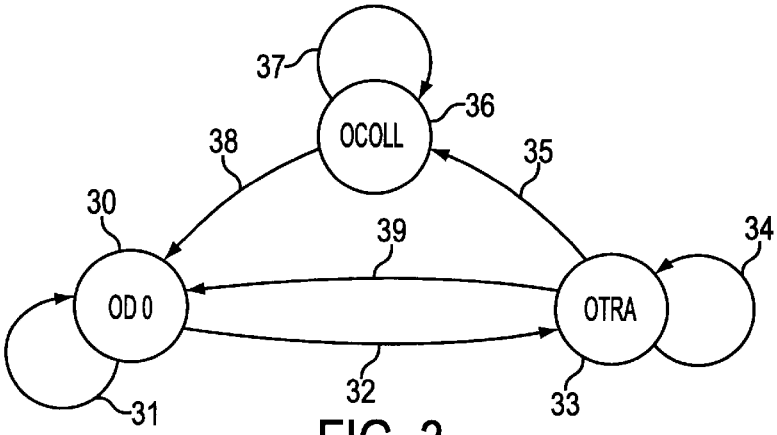
FIG. 3 is a state diagram useful for the implementation of the invention.

From there, the present invention provides for the definition of observations, which may be recorded in an observation register RO (FIG. 2), complying with the state diagram in FIG. 3. Observation register RO provides observation signals to network interface I via transmission/reception management device DG. Network interface I also includes pseudo-random generator GPA.

The concept of "vacant slot" should first of all be defined.

The "vacant slot" is an interval of time, the duration of which is determined in advance, and during which the transmission channel is vacant, that is to say it is not carrying any message. The minimum duration of a vacant slot is greater than the propagation time of a signal from end to end over the entire channel.

In other words, the vacant slot is the interval of time required for an observer of the channel to be assured that no terminal has commenced transmitting, having regard to the effect of the propagation times.

According to the present invention, the respective mean durations of the collision slot and vacant slot are termed C and D. These durations are determined according to the structure of the transmission channel used. In the case of a radio network, as described in the parallel patent application mentioned above, the duration C must in principle be chosen so as to be fairly long, because of the coding techniques, with interlacing, used for error detection. This is because it is then necessary to have received a substantial quantity of information before decoding in order to be able to obtain the first decoded bit.

In FIG. 3, it is assumed that the starting point is a vacant slot (30) representing the observation OD0. On each occasion that a time B has elapsed, the vacant slot observation is renewed (31).

Each start of transmission (32) will bring about a change to the observation OTRA at 33. This observation is renewable (34) if in the meantime there is a change to the vacant channel event for a time less than B.

Return to the vacant state will bring about a return to the observation OD0 at 30, but only at the end of the time B (arrow 39).

In the event of collision (35), we go to the observation OCOLL at 36. This observation is renewable (37) on each occasion that a time C has elapsed. There too, return to the vacant state will bring about a return to the observation OD0 at 30, but only at the end of the time B (arrow 38).

Figure 4:
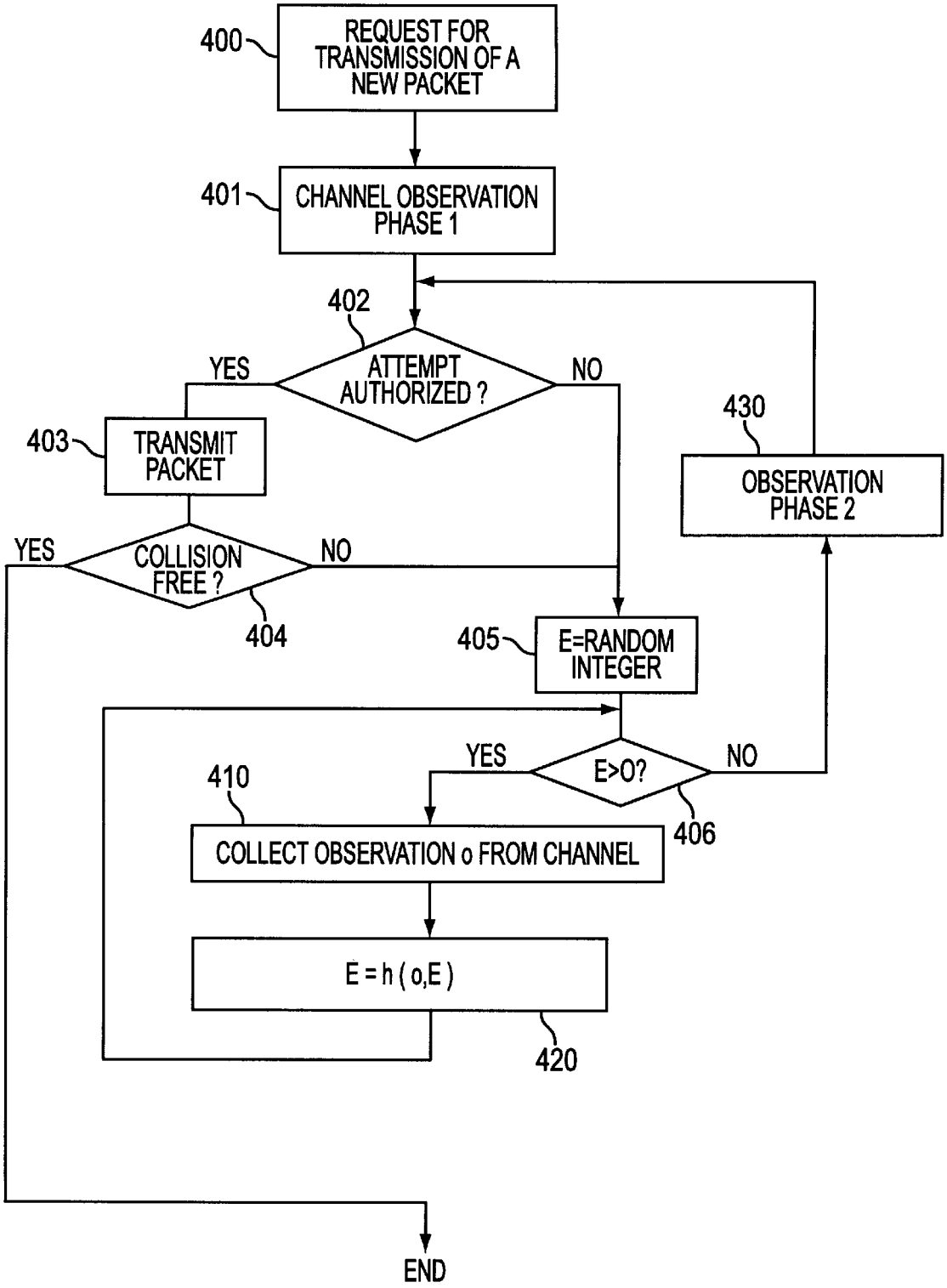
FIG. 4 is a skeleton flow diagram of the transmission monitoring and collision resolution mechanisms used according to the invention.

Reference is now made to FIG. 4. This illustrates a collision resolution mechanism which can be produced by means of the management device incorporated in the unit I in FIG. 2.

The input 400 in FIG. 4 represents a situation in which a data packet is to be transmitted.

The step 401 designates the first channel observation phase, referred to as phase 1.

The step 402 determines, in accordance with the previous observation phase, whether an attempt may be made to transmit the packet. For example, the end of the current slot, and therefore the refreshing of the observation register, may be awaited; transmission is enabled only if the observation validated as the end of the slot is "vacant" or "transmission". More generally, the steps 401 and 402 may be based on any predetermined criterion involving a sequence of observations of determinable length.

If yes, the step 403 demands the transmission of the packet. The test 404 determines whether or not there is a collision (observation OCOLL) on this transmission. It is known that, when there is a collision, the network interface provides for the continuation of the transmission until the end of the minimum duration C of a collision slot.

In the absence of a collision, the transmission is successful, the data packet is validated for the transmission, and this is the end of the mechanism.

In the event of failure, we go to a second part of the mechanism, which begins at step 405 and concerns the collision resolution proper.

This step 405 consists of the selection of an integer E meeting predetermined conditions, but preferably defined in a random manner. In a particular embodiment, account is also taken of an integer specific to the terminal, optionally a clock integer, that is to say one related to time.

The integer E lies between two limit integers, which are here denoted 0 and M−1 (where M is at least 2).

The step 406 determines whether the current value of E is zero, in which case we go back to step 402 after a new phase of observation of the channel 430, referred to as phase 2.

This phase 2, which may be the same as phase 1, delivers or does not deliver a transmission attempt authorization.

If not, the step 410 consists of collecting the current observation of the channel, for example by reading the register RO. And the step 420 consists of updating the integer E as a function of its previous value and the observation or observations. That is to say the updating may be effected either as a function of the last observation or of the series or sequence of last observations. After this updating, we return to step 406.

In other words, the current integer (E) is updated by causing it to vary according to a predetermined law h(o,E), which is a function of the observation signal o (or series of values of this observation signal) and of the previous value E.

It is a requirement for this law to tend to move the current integer away from the first limit integer (0), in the event of an abundance of collision slots; it will tend to move it closer to it in the event of an abundance of vacant slots.

When the current integer (E) reaches the first limit integer (0), a transmission attempt will once again be enabled or otherwise (step 402), after a phase of observation of the channel (step 430).

A few examples of specific laws will be given below, before describing a particular embodiment.

In general, observation is taken to mean one of the following three possibilities: "vacant slot", "collision slot" and "transmission OK" (that is to say a period of transmission without any indication of collision). The variation laws for the current integer (E) may be:

h("collision",E)=E+M−1;

h("vacant slot",E)=E−1;

h("transmission OK",E)=E (or E−1, as a variant).

And for the observation phases for the purpose of transmission authorization:

phase 1 and 2: "authorization to transmit at the next end of slot" (refreshing of the observation register).

For phase 1, the following variant can be accepted:

phase 1: "await the next end of slot, and authorization to transmit except if the slot which is ending is a collision slot".

There are embodiments which are a little more sophisticated, using more extensive observations. For example, M=2 gives the following modified protocol:

Phase 2: "await the next end of slot, and authorization to transmit except if there is a series of vacant slots following on from a collision slot and the last failure goes back more than one vacant slot";

h("series of vacant slots after collision",E)=E, (if E>1), otherwise h' "vacant slot",E)=E−1 (that is to say when the last non-vacant slot is not a collision slot).

This version may have better performance than the basic versions. Nevertheless, this modified protocol may pose a problem if the network does not have very high reliability.

Figure 5:
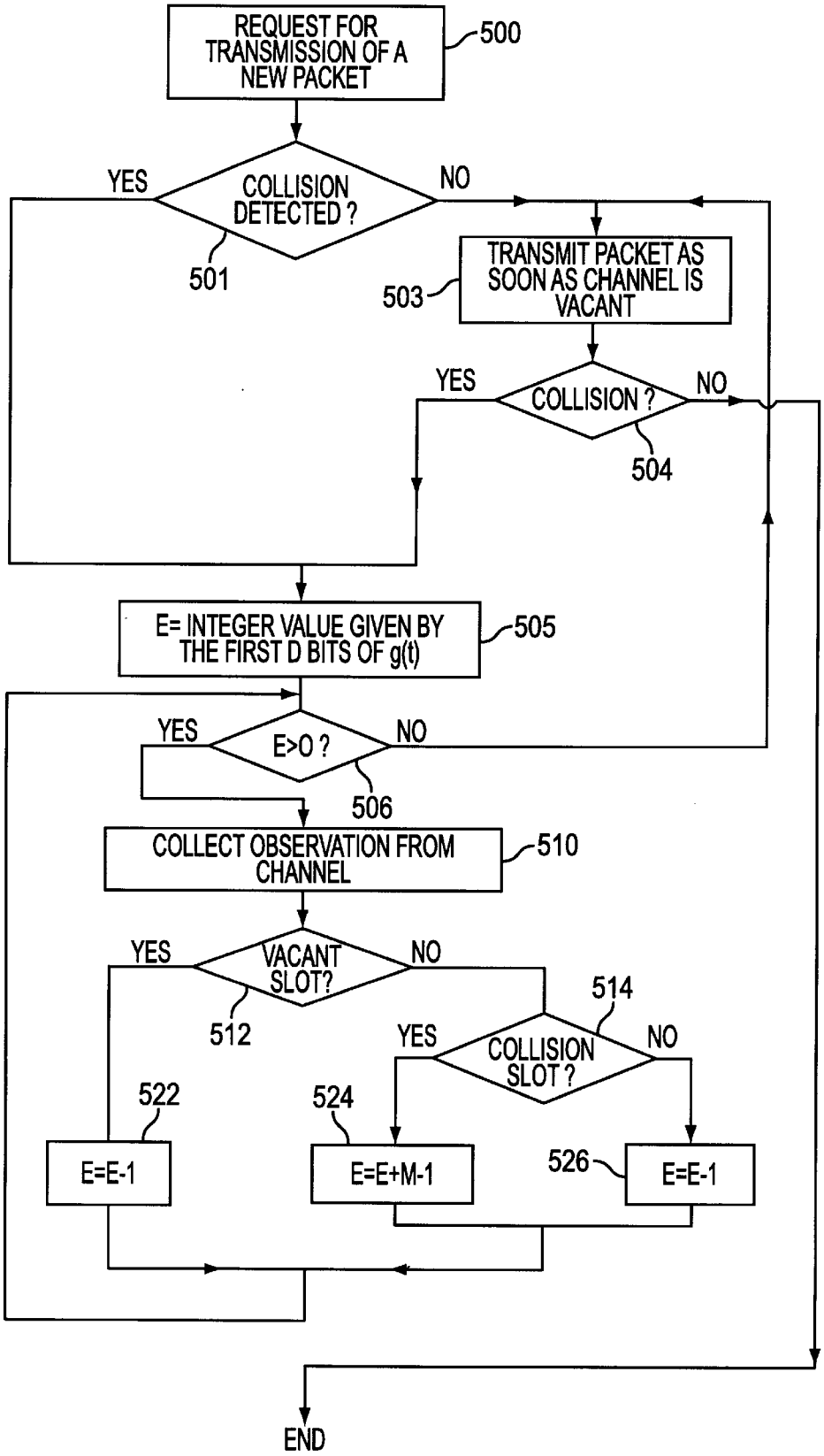
FIG. 5 is a more detailed flow diagram of the transmission monitoring and collision resolution mechanisms used according to the invention.

A particular embodiment will now be described with reference to FIG. 5 (in which the steps correspond in general to those in FIG. 4, increased by 100). At step 501, the authorization to transmit is based simply on whether or not a collision is detected before the channel goes to the vacant state for the first time. The step 503 consists of a transmission as soon as the channel is vacant. If E=0 at step 506, there will be a direct return to there (no physical step corresponding to 430, FIG. 4, the phase 2 condition being vacancy of the channel). Steps 512 to 526 are a breakdown of step 420 in FIG. 4.

To summarise this particular embodiment:

what is referred to as "observation" or "o" is one of the following three possibilities: "vacant slot", "collision slot" and "transmission OK", this set is considered as follows. There is "transmission OK" as long as there has not been a collision event (in fact, "collision slot") and the vacant channel state has not lasted sufficiently long (duration B) to constitute a "vacant slot" There is a change to "vacant slot" only when the vacant channel event has lasted for duration B. When there has been a change to "collision slot", this lasts at least for the time C.

The predetermined law h(o,E) is then:

h("collision",E)=E+M−1 h("vacant",E)=max(E−1; 0)

where MAX takes the highest of its 2 arguments and, depending on the variant chosen, either h("transmission",E)=E or h("transmission",E)=E−1

This can be referred to as "stacked collision resolution protocol".

It was stated above that the integer E lies between two limit integers, which are in this case denoted 0 and M−1. Mention has also been made of incrementing and decrementing. Naturally, all these definitions are relative, in that all the quantities referred to as integers may as desired be multiplied or divided by the same factor, whilst preserving the functioning of the invention. Likewise, the role of the two limits can be transposed, as well as the incrementing and decrementing operations.

In addition it is desirable, but not absolutely essential, for the limit integer M−1 to be equal to the integer part of the ratio C/B between the duration of the collision slot and the duration of the vacant slot.

A means useful to the implementation of this mechanism is a pseudo-random generator, which will supply, as a function of time, a signal representing a random integer which is denoted g(t).

A fairly general example of a pseudo random generator consists of using a congruent generator of integers, capable of supplying numbers of D bits in a sequence of random appearance over a considerable time. D is preferably around 10. The numbers thus presented follow each other at a chosen frequency, with which a period $T_A$ will be associated.

The number g(t) is for example a number between 0 and 1, which is written in binary as the D bits in question.

In a known manner, the generation of pseudo-random numbers of this type may be based on an operator using two specific integers p and q, and supplying a calculated integer x(t) by means of the operation $$x(t)=p*x(t-T_A)+q \text{ (modulo } 2^D)$$

The expression (modulo $2^D$) means that the result of the operation is referred to the remainder of its integer division by $2^D$, as is known by persons skilled in the art.

Persons skilled in the art also know that it is possible to choose the numbers p and q so that the series of numbers x(t) describe all the numbers of D bits possible, in a quasi-disordered fashion, with a looping period of $2^D*T_A$.

Using such an operator, the number g(t) is obtained by the operation $$g(t)=x(t)+i+k \text{ (modulo } 2^D)$$

In this relationship, i is an integer specific to the terminal, for example the serial number of a component, or the address of the terminal in the network; k is the integer value of a local clock counter at the time in question.

It may happen that the number i has a length exceeding D bits. In this case, the number chosen is divided into different packets with sizes of D bits and the subpackets thus obtained are used successively and periodically in place of i.

It is also possible to carry out the updates of the number g(t) solely at the moment when the mechanism is consulting and making use of this number g(t), instead of keeping to a periodic re-updating of period $T_A$.

It is also possible that, at the time of each consultation, an operation other than updating could be carried out on the number g(t) (for example retaining only a limited number of bits), in order to maintain the random appearance between two consultations separated by less than $T_A$ units of time.

The question of the message transmission priorities will now be considered.

Monitoring times are defined with a periodicity $T_A$.

Figure 6:
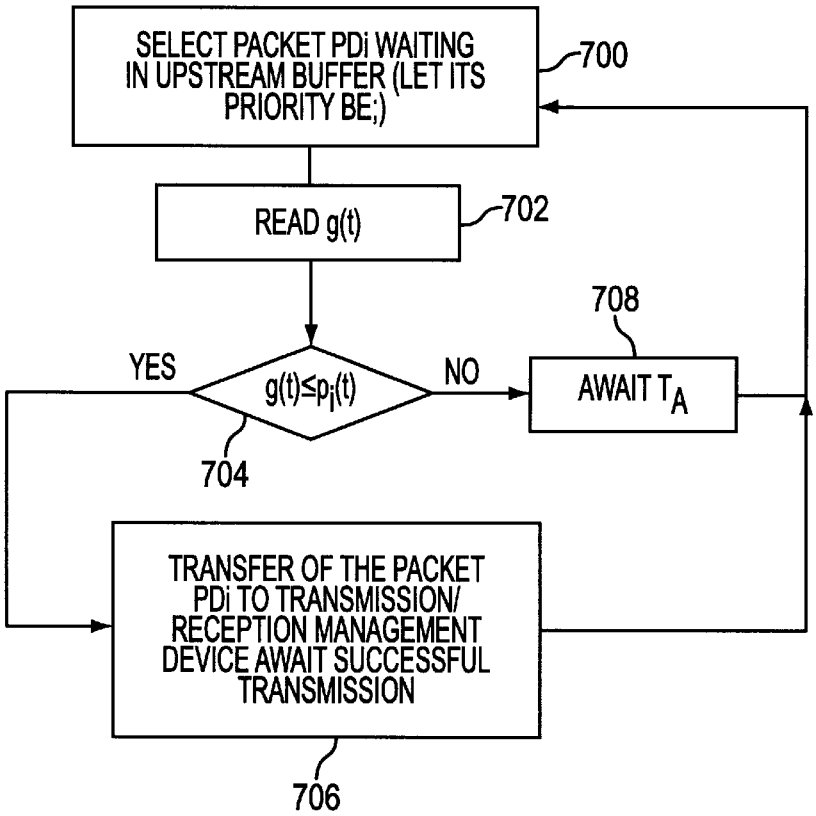
FIG. 6 is a flow diagram illustrating the implementation of priority monitoring for the messages according to the invention.

Step 700 (FIG. 6) selects the packet awaiting transmission $pd_i$ which has the highest priority i.

At step 702, a pseudo-random number will be selected, the current value of which is denoted g(t) (this g(t) may be the same as for the collision resolution).

At the same time, a series of quantities of probability $p_i(t)$ is maintained, equal in number to the number n of priority levels to be managed (i goes from 1 to n). This will be described in detail later.

It is clear that the transmission/reception manager can, during transmission, manage only a single packet at any one time. It is assumed that other packets awaiting transmission may be stored in an upstream buffer managed by the upper layers of the protocol. A necessary condition is the fact that any packet to be transmitted must first be stored in the upstream buffer before being directed to the transmission/reception manager as described below.

When the transmission/reception manager is vacant, for any packet stored in the upstream buffer—let its priority be i—a comparison (704) is carried out (700) between the associated quantity $p_i(t)$ and the number g(t) selected at step 702. The order of consultation of the packets is left to choice, and the operation is repeated when all the packets have been consulted. The packet $PD_i$ is transmitted (706) to the transmission/reception manager with a request to transmit only if $g(t)<=p_i(t)$ at 704. In this case the selection mechanism is made dormant until the transmission/reception manager becomes vacant again (that is to say when the previous packet $PD_i$ has been validated for transmission). Otherwise a time TA is waited and we go back to 700.

A so-called "preemption" variant consists of not waiting for the transmission/reception manager to be vacant to carry out the selection of a new packet in the upstream buffer. In this case, it is preferable for the transfer to take place only if the priority of the new packet selected is higher than the priority of the packet which is already present in the transmission/reception manager. The latter packet will then be returned to the upstream buffer.

A person skilled in the art will understand that the priority management is meaningful only as from the time when the communication request is such that the performance of the network may thereby be degraded. The role of the priority management mechanism is to decide, in accordance with the traffic constraints, on the transfer of such a packet from the upstream buffer to the collision management device, and thus to monitor and limit the total instantaneous traffic which actually has access to the communication medium in accordance with competing priorities.

This may apply not only in order to give different priorities to voice frames and data frames (files), but also for example to service frames, such as so-called ADF frames, useful to the radio network of the above-mentioned parallel patent application.

Figure 7:
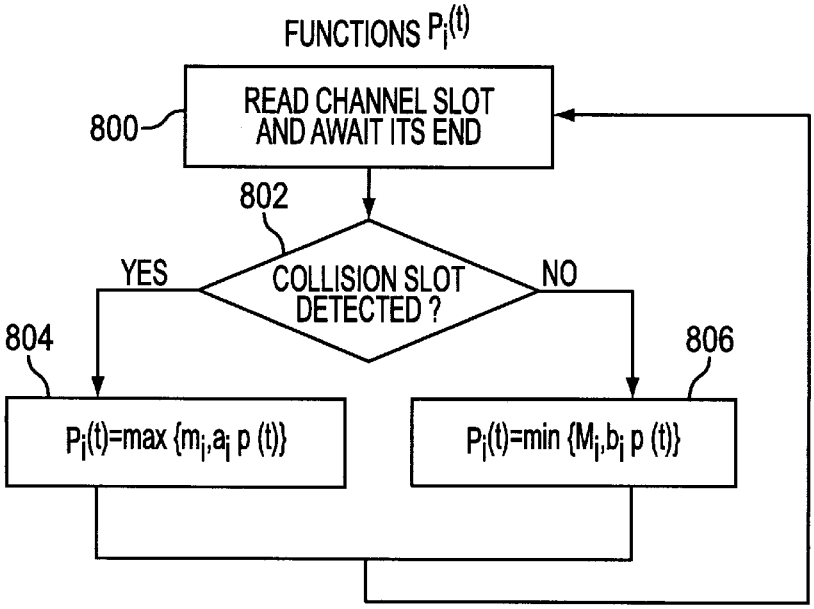
FIG. 7 is a flow diagram illustrating the maintenance of functions $p_i(t)$ useful to the implementation of the priority monitoring.

Each quantity $p_i(t)$ is maintained (FIG. 7) in accordance with the "observations" defined above, by means of another law or re-updating function $q_i(p_i(t), \text{"o"})$, where "o" designates an observation or series of observations. As before, even if it is identical to the previous one, any observation (or series of observations) brings about an updating of $p_i(t)$.

The law or function q( ) should tend to decrease $p_i(t)$ in the event of an abundance of collision slots; it will tend to increase it in the event of an abundance of vacant slots.

In a particular embodiment, the "observations" or "o" are just one of the three possibilities mentioned above: "vacant slot", "collision slot" and "transmission OK".

It is also accepted that each quantity $p_i(t)$ is suitably initialized, and that its initial value may moreover be 0.

The predetermined law $q_i(p_i(t), \text{"o"})$ is then:

$$q_i(p_i(t), \text{"collision"})=\text{Max}\ \{m_i;\ a*p_i(t)\}$$

where MAX takes the higher of its two arguments, $$q_i(p_i(t), \text{"vacant"})=Min\ \{M_i;\ b_i*p_i(t)\}$$

where Min takes the lower of its two arguments, and, depending on the variant chosen, $$q_i(p_i(t), \text{"transmission"})=p_i(t)$$

or $$q_i(p_i(t), \text{"transmission"})=\text{Min}\ \{M_i;\ b*p_i(t)\}$$

This variant is coupled to those of the collision resolution, defined above.

It is necessary for $a_i$, $m_i$ and $M_i$ to be strictly lower than 1, and $b_i$ strictly higher than 1.

The coherence of the priority mechanism means that, wherever i>0, $$a_i*(b_i)^{M-1}>a_{i-1}*(b_{i-1})^{M-1}$$

Thus, in adjusting the parameters a and b according to the "degree of connection" M, account is taken of the product of a, and of b itself raised to the power M−1.

If the stacked collision resolution protocol is used (the detailed embodiment defined above), it is necessary for all the products $a_i*(b_i)^{M-1}$ to be less than 1.

In fact, the closer this product is to unity, the less the quantity of instantaneous traffic undergoes any restriction and the more the performance in critical utilization of the network is degraded.

We claim:

1. A device for connecting a data processing terminal to a transmission channel in a computer network, comprising:

a network interface capable of transmission/reception of messages over the transmission channel and monitoring of the transmission channel in order to establish event signals which represent a detection of the start of a transmission on the transmission channel, a detection of a new collision, and a detection of a return of the transmission channel to a vacant state, a transmission/reception management device for controlling the network interface in accordance with the event signals, and

[a means for ensuring that, in the event of a collision, transmission is maintained, with indication of the collision, for at least a first minimum period, after which all transmission is interrupted,]

[wherein the means for ensuring includes] a channel observation register which receives the event signals and in response establishes a channel observation signal having a predetermined set of possible states including transmission OK, ["collision slot"] *"collision"* and "vacant slot", the channel observation register being refreshed at least upon a channel vacant event,

[and] wherein the management device reacts to a request for the transmission of a new data packet according to the channel observation register by:

a) being in a normal mode, the normal mode including awaiting the next refreshing of the channel observation register, and effecting or not effecting a first transmission attempt in accordance with a predetermined criterion applied to the state of the channel observation register prior to said next refreshing, b) in the event of failure, b1) initializing a current integer to a value between a first and a second limit integer, inclusive, and b2) modifying the current integer at each change of state of the channel observation register, in accordance with a predetermined law which tends to move the current integer away from the first limit integer if there is an abundance of collision slots, and to move the current integer closer to the first limit integer if there is an abundance of vacant slots, and returning to the normal mode only when the current integer has reached the first limit integer so that the reaction of the management device to a request for transmission of a new data packet is independent of the history of the channel prior to the last normal mode executed.

2. A device according to [claim 1,] *claim 16,* wherein the predetermined criterion comprises the absence of a collision [slot].

3. A device according to [claim 1,] *claim 16,* wherein the transmission observation is confirmed, after a start of transmission event, when there is a channel vacant event not preceded by a collision since the start of the transmission, in that the collision time slot observation is confirmed at a channel vacant event which follows the transmission with [signalling] *signaling* of collision, and in that the vacant slot observation is confirmed when the channel vacant slot has lasted for a second [minium] *minimum* period.

4. A device according to claim 1, wherein the initial value of the chosen integer is substantially random.

5. A device according to claim 1, wherein the current integer is also moved closer to the first limit integer when there is a transmission without collision.

6. A device according to claim 1, wherein the said predetermined law comprises:

as long as the current integer is not equal to the first limit integer, incrementing the current integer by a first chosen step if the channel observation register indicates a collision [slot], or decrementing the current integer by a second chosen step if the channel observation register indicates a vacant slot, the ratio of the first step to the second step being substantially equal to the difference between the two limit integers.

7. A device according to claim 1, wherein the transmission/reception management device does not transmit if a collision state already exists when the transmission/reception management device receives a request to transmit.

8. A device according to [claim 1,] *claim 3,* wherein *in case of immediate collision detection* the difference between the two limit integers is substantially equal to an integer part of the ratio of the first *minimum* period to the second *minimum* period.

9. A device according to claim 1, wherein the current integer is supplied by a pseudo-random generator which modulates an integer of at least 10 bits by at least one integer of no more than 10 bits, specific to the data processing terminal.

10. A device according to claim 9, wherein the current integer is supplied by a pseudo-random generator which modulates an integer of at least 10 bits by at least one integer of no more than 10 bits, specific to the data processing terminal, and by a clock integer.

11. A device according to claim 1, wherein the requests for the transmission of a new data packet are accompanied by priority information from a predetermined set of priority classes, and wherein the management device maintains, for each priority class, a quantity representing a level of occupation of the transmission channel, such that a current request is taken into account only if the said quantity for the priority class corresponding to the current request is in a predetermined relationship with a random quantity.

12. A device according to claim 11, wherein each quantity varies in accordance with a predetermined law which is a function of the channel observation signal, in order to increase the corresponding occupation of the transmission channel in the case of a collision [slot], and to decrease the corresponding occupation of the transmission channel in the case of a vacant slot.

13. A device according to claim 12, wherein the quantity is also modified by the management device to reduce the corresponding occupation of the transmission channel when thee is a transmission without collision.

14. A device according to claim 11, wherein the quantities and the random quantity are standardized to unity by the management device such that, for a representative quantity, the predetermined relationship is a comparison of the random quantity with the representative quantity.

15. A method for the resolution of collisions in a data transmission network of the random access type where each terminal is provided with a network interface suitable for transmission/reception on a transmission channel, with monitoring of the channel in order to establish event signals which selectively represent detection of a start of transmission, detection of a new collision, and detection of a return of the channel to a vacant state, wherein, upon a request to transmit a data packet, the data packet is transmitted as soon as the vacant state is obtained in the absence of a collision, thereby enabling transmission of a current data packet, and return to a state of awaiting a request to transmit another data packet, and wherein, when there is a collision, transmission is extended for a first chosen period and then interrupted, wherein, in response to an event signal, a channel observation signal is established from amongst a predetermined set of possibilities comprising transmission (emission or reception), "collision slot" and "vacant slot" the collision slot being made subject to a first minimum period from a new collision detection, and the vacant slot existing only when the vacant state has lasted for a second minimum period at least equal to a maximum outward and return propagation time for a signal on the transmission channel and less than the first minimum period, and wherein, when there is a collision, i) a current integer is initialized at a value between a first and a second limit integer, inclusive, ii) on a new observation, the current integer is varied in accordance with a predetermined law which is a function of the new observation, in order to move the current integer away from the first limit integer if there is an abundance of collision slots and to move the current integer closer to the first limit integer if there is an abundance of vacant slots, iii) transmission being possible only when the current integer reaches the first limit integer.

*16. A device according to claim 1, further comprising a means for detecting a collision during the transmission and maintaining the transmission with indication of the detected collision for at least a first minimum period, after which all transmission is interrupted.*

* * * * *